United States Patent
Kenworthy et al.

(10) Patent No.: US 10,274,265 B2
(45) Date of Patent: Apr. 30, 2019

(54) SPIRAL WOUND CROSS-FLOW HEAT EXCHANGER

(71) Applicant: Unison Industries, LLC, Jacksonville, FL (US)

(72) Inventors: Michael Thomas Kenworthy, Beaver Creek, OH (US); Ricardo Arturo Gutierrez Espinosa, Queretaro (MX)

(73) Assignee: Unison Industries, LLC, Jacksonville, FL (US)

( * ) Notice: Subject to any disclaimer, the term of this patent is extended or adjusted under 35 U.S.C. 154(b) by 83 days.

(21) Appl. No.: 15/514,533

(22) PCT Filed: Oct. 6, 2015

(86) PCT No.: PCT/US2015/054168
§ 371 (c)(1),
(2) Date: Mar. 27, 2017

(87) PCT Pub. No.: WO2016/057471
PCT Pub. Date: Apr. 14, 2016

(65) Prior Publication Data
US 2017/0219295 A1    Aug. 3, 2017

Related U.S. Application Data

(60) Provisional application No. 62/060,721, filed on Oct. 7, 2014.

(51) Int. Cl.
*F02C 7/14* (2006.01)
*F28D 7/04* (2006.01)
(Continued)

(52) U.S. Cl.
CPC .................. *F28F 3/04* (2013.01); *F02C 7/14* (2013.01); *F02K 3/115* (2013.01); *F28D 7/04* (2013.01);
(Continued)

(58) Field of Classification Search
CPC ...... F28F 3/04; F28F 1/02; F28F 1/022; F28F 3/044; F28F 3/048; F28F 9/0243;
(Continued)

(56) References Cited

U.S. PATENT DOCUMENTS 2,435,557 A * 2/1948 Eyre ......................... F02C 7/14
417/408
2,663,549 A * 12/1953 Otten ....................... F28D 9/04
165/150

(Continued)

FOREIGN PATENT DOCUMENTS

| EP | 1114975 A2 | 7/2001 |
|---|---|---|
| FR | 2847974 A1 | 6/2004 |
| GB | 2406164 A | 3/2005 |
| JP | 2002371864 A | 12/2002 |
| JP | 2004037020 A | 2/2004 |
| JP | 2004176949 A | 6/2004 |

(Continued)

OTHER PUBLICATIONS

International Search Report issued in connection with corresponding PCT application PCT/US2015/054168 dated Jan. 22, 2016.

*Primary Examiner* — Justin M Jonaitis
(74) *Attorney, Agent, or Firm* — General Electric Company; Pamela A. Kachur

(57) ABSTRACT

A heat exchanger is provided. The heat exchanger is formed of a spiral wound flow body (70) having a plurality of passages (76) ending therethrough for passage of a first fluid. The flow body is positioned within a housing (42) and a cross-flow of a second fluid passes between or across successive layers of the spiral wound flow body. The intermixing of the thermal energy of the cross-flowing second fluid and the first fluid provide improved heat exchange.

17 Claims, 11 Drawing Sheets

(51) Int. Cl.
*F28F 1/02* (2006.01)
*F28F 3/04* (2006.01)
*F28F 9/02* (2006.01)
*F02K 3/115* (2006.01)
*F28D 21/00* (2006.01)
*F28F 13/12* (2006.01)

(52) U.S. Cl.
CPC ................ *F28F 1/02* (2013.01); *F28F 1/022* (2013.01); *F28F 3/044* (2013.01); *F28F 3/048* (2013.01); *F28F 9/0243* (2013.01); *F28F 13/12* (2013.01); *F05D 2250/15* (2013.01); *F28D 2021/0026* (2013.01); *F28D 2021/0049* (2013.01); *Y02T 50/671* (2013.01)

(58) Field of Classification Search
CPC .. F28F 13/12; F02C 7/14; F02K 3/115; F28D 7/04; F28D 2021/0026; F28D 2021/0049; F05D 2250/15; Y02T 50/671
USPC ................................ 165/163, 41, 42, 44, 235
See application file for complete search history.

(56) References Cited

U.S. PATENT DOCUMENTS

| | | | | |
|---|---|---|---|---|
| 3,379,244 | A | * | 4/1968 | Gilli ................ F28D 7/08 122/250 R |
| 3,848,665 | A | * | 11/1974 | Uerlichs ................ C21B 9/12 165/168 |
| 4,063,589 | A | * | 12/1977 | Battcock ................ F28D 7/04 165/104.16 |
| 4,883,117 | A | * | 11/1989 | Dobbs ................ F28D 7/0033 165/164 |
| 4,893,672 | A | * | 1/1990 | Bader ................ F28D 7/024 165/163 |
| 7,918,268 | B2 | | 4/2011 | Oswald |
| 8,485,246 | B2 | | 7/2013 | Oudjedi |
| 8,573,290 | B2 | | 11/2013 | Blomgren |
| 2014/0027102 | A1 | | 1/2014 | Antel, Jr. |

FOREIGN PATENT DOCUMENTS

| | | |
|---|---|---|
| JP | 2007017132 A | 1/2007 |
| WO | 7900766 A1 | 10/1979 |

* cited by examiner

SPIRAL WOUND CROSS-FLOW HEAT EXCHANGER

CROSS-REFERENCE TO RELATED APPLICATIONS

This PCT utility application claims priority to and benefit from currently pending provisional application having U.S. Patent Application Ser. No. 62/060,721, titled "SPIRAL WOUND CROSS-FLOW HEAT EXCHANGER" and having filing date Oct. 7, 2014, all of which is incorporated by reference herein.

BACKGROUND

The present embodiments generally pertain to an apparatus, methods, and/or systems for improving heat exchange. More particularly, but not by way of limitation, the present embodiments relate to spiral wound cross-flow heat exchangers, which may be used for example in a gas turbine engine, for fluid-fluid heat exchange. As one skilled in the art will understand, while various embodiments are described relative to a gas turbine engine, the apparatus, methods and/or systems may also be used in various alternative applications where it is desired that heat be exchanged between two fluids.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially therebetween. An air inlet or intake is located at a forward end of the gas turbine engine. Moving toward the aft end, in order, the intake is followed by a compressor, a combustion chamber, and a turbine. It will be readily apparent from those skilled in the art that additional components may also be included in the engine, such as, for example, low pressure and high pressure compressors, and low pressure and high pressure turbines. This, however, is not an exhaustive list.

It is necessary to manage heat generation within a gas turbine engine so as not to raise engine temperatures to unacceptable levels. For example, it may be desirable to control oil temperatures within the gas turbine engine which lubricates bearings associated with the high pressure shaft and/or the low pressure shaft. Further, during operation, significant heat is generated by the high pressure compressor which generates high temperature flow. Therefore, it may also be desirable to cool air exiting one or both of the high pressure compressor and the low pressure compressor.

In order to cool these fluids, various methods have been used however, improvements are still desirable. For example, improvement of parameters which are continually sought for heat exchangers include, but are not limited to, decreased weight, decreased volume, decreased pressure drop across the heat exchangers and decreased resistivity to thermal exchange. Another parameter which is pertinent is to heat exchangers heat rejection during operation.

It would be desirable to provide a heat exchanger for two or more fluid flows which prevent fluid mixing but which satisfies parameters to improve heat exchange between the two or more fluids and is formed of a shell-tube construction.

The information included in this Background section of the specification, including any references cited herein and any description or discussion thereof, is included for technical reference purposes only and is not to be regarded subject matter by which the scope of the instant embodiments are to be bound.

SUMMARY

According to present embodiments, a fluid to fluid heat exchanger is provided. The heat exchanger is formed of a spiral wound flow body having a plurality of passages ending therethrough for passage of a first fluid. The flow body is positioned within a housing and a cross-flow of a second fluid passes between the turns of the spiral wound flow body. The intermixing of the thermal energy of the cross-flowing second fluid and the first fluid provide improved heat exchange.

According to some embodiments, a spiral wound fluid-fluid heat exchanger comprises a first fluid manifold, a flow body in flow communication with the first fluid manifold, the flow body having a plurality of flow passages extending between a first end and a second end for a first fluid, the flow body extending about the first manifold and defining a spiral formed by an involute of a circle, a second fluid manifold in flow communication with the flow body, the flow body disposed within a housing that defines a cross-flow path for a second fluid, the cross-flow path extending between successive layers of the flow body.

All of the above outlined features are to be understood as exemplary only and many more features and objectives of the apparatus, methods and systems of the spiral wound cross-flow heat exchanger may be gleaned from the disclosure herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims. Therefore, no limiting interpretation of this Summary is to be understood without further reading of the entire specification, claims, and drawings included herewith.

BRIEF DESCRIPTION OF THE DRAWINGS

The above-mentioned and other features and advantages of these exemplary embodiments, and the manner of attaining them, will become more apparent and the spiral wound cross-flow fluid to fluid heat exchanger will be better understood by reference to the following description of embodiments taken in conjunction with the accompanying drawings, wherein.

DETAILED DESCRIPTION

Figure 1:
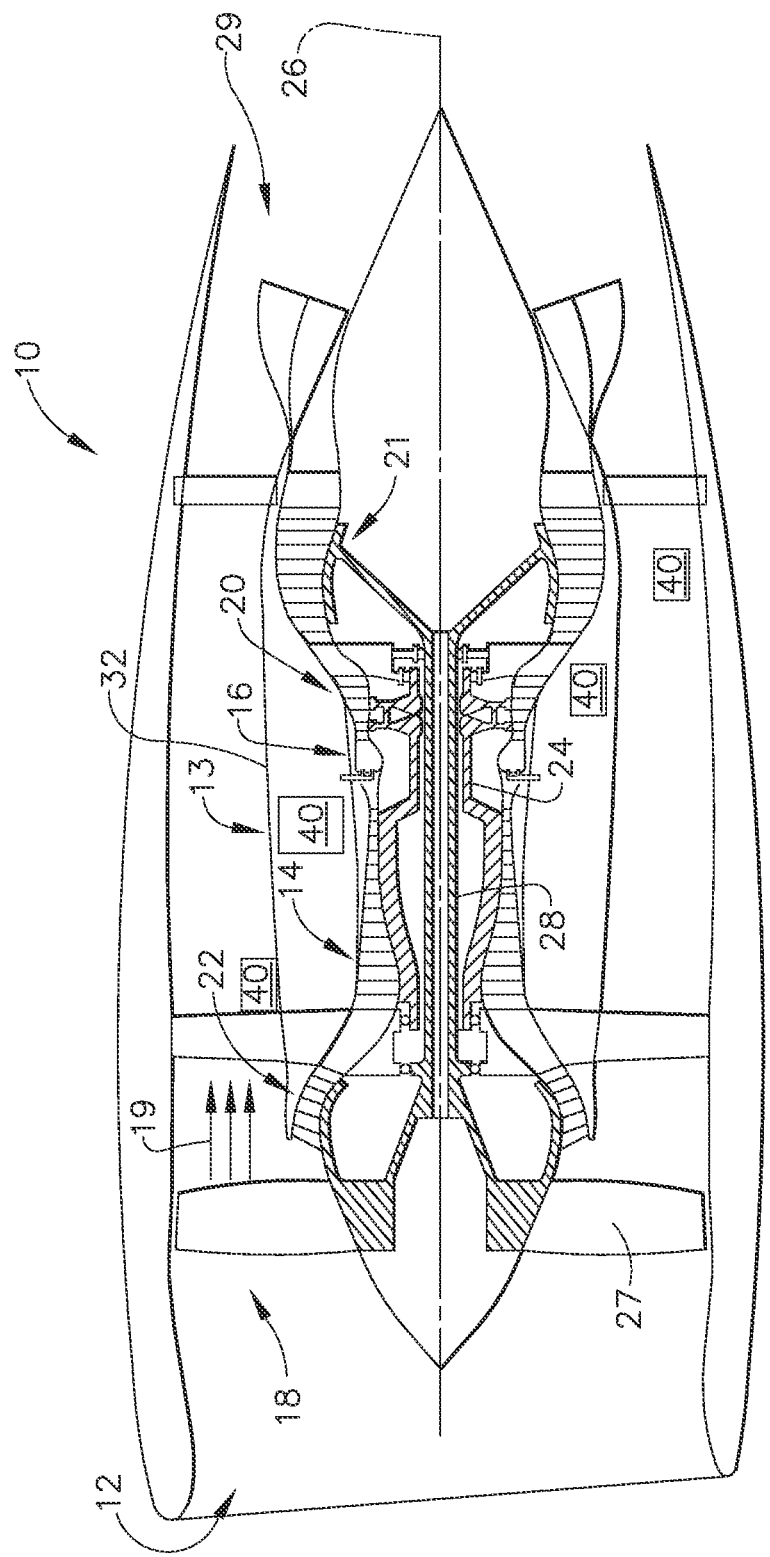
FIG. 1 is a schematic side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-11, various embodiments of spiral wound cross-flow heat exchangers are depicted. The heat exchanger includes a shell or housing which is positioned about a spiral wound flow body. The spiral flow body may be, according to some embodiments, a spiral formed by the involute of a circle so that a plurality of layers or turns are created. The housing creates an outer flow boundary within which the flow body is provided. The housing allows for a cross-flow between and across the successive layers of the spiral flow body to exchange thermal energy from a first fluid within the flow body to the second fluid in the cross-flow.

As used herein, the terms "axial" or "axially" refer to a dimension along a longitudinal axis of an engine or along the axial direction of the heat exchanger. The term "forward" used in conjunction with "axial" or "axially" refers to moving in a direction toward the engine inlet or heat exchanger, or a component being relatively closer to the engine inlet or heat exchanger as compared to another component. The term "aft" used in conjunction with "axial" or "axially" refers to moving in a direction toward the engine outlet or heat exchanger, or a component being relatively closer to the engine outlet or heat exchanger as compared to an inlet. As used herein, the terms "radial" or "radially" refer to a dimension extending between a center longitudinal axis of the engine or the heat exchanger and an engine or heat exchanger circumference thereof. The term cross-flow as used herein means that the direction of one flow traverses the direction of another flow, without the flows mixing.

Referring initially to FIG. 1, a schematic side section view of a gas turbine engine 10 is shown having an engine inlet end 12 wherein air enters the core propulsor 13 which is defined generally by a multi-stage high pressure compressor 14, a combustor 16 and a multi-stage high pressure turbine 20. Collectively, the core propulsor 13 provides power for operation of the gas turbine engine 10.

The gas turbine engine 10 further comprises a fan 18, a low pressure turbine 21, and a low pressure compressor 22. The fan 18 includes an array of fan blades 27 extending radially outward from a rotor disc. Opposite the engine inlet end 12 in the axial direction is an exhaust side 29. In these embodiments, for example, gas turbine engine 10 may be any engine commercially available from General Electric Company. Although the gas turbine engine 10 is shown in an aviation embodiment, such example should not be considered limiting as the gas turbine engine 10 may be used for aviation, power generation, industrial, marine or the like.

In operation, air enters through the engine inlet end 12 of the gas turbine engine 10 and moves through at least one stage of compression in the low pressure compressor 22 and high pressure compressors 14 where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the high pressure shaft 24. The high pressure shaft 24 passes toward the front of the gas turbine engine 10 to cause rotation of the one or more high pressure compressor 14 stages and continue the power cycle. A low pressure turbine 21 may also be utilized to extract further energy and power additional compressor stages. The fan 18 is connected by the low pressure shaft 28 to a low pressure compressor 22 and the low pressure turbine 21. The connection may be direct or indirect, such as through a gearbox or other transmission. The fan 18 creates thrust for the gas turbine engine 10.

The gas turbine engine 10 is axi-symmetrical about engine centerline axis 26 so that various engine components rotate thereabout. An axi-symmetrical high pressure shaft 24 extends through the gas turbine engine 10 forward end toward an aft end and is rotatably supported by bearings along the length of the shaft structure. The high pressure shaft 24 rotates about the centerline axis 26 of the gas turbine engine 10. The high pressure shaft 24 may be hollow to allow rotation of a low pressure shaft 28 therein and independent of the high pressure shaft 24 rotation. The low pressure shaft 28 also may rotate about the centerline axis 26 of the gas turbine engine 10. During operation the high pressure and low pressure shafts 24, 28 rotate along with other structures connected to the shafts 24, 28 such as the rotor assemblies of the turbines 20, 21 in order to create power or thrust for various types of turbines used in power and industrial or aviation areas of use.

The gas turbine engine 10 further comprises a spiral wound cross-flow heat exchanger 40. In the exemplary schematic view, the one or more spiral wound cross-flow heat exchangers 40 are shown in various locations for purpose of teaching. The spiral wound cross-flow heat exchanger 40 may be utilized for a variety of fluid cooling functions, including but not limited to, liquid cooling and air cooling. In the instance of liquid cooling, it may be desirable to cool oil or other relatively higher temperature liquid with one or more relatively cooler temperature sources in the gas turbine engine 10. The oil may be cooled by air such that the cooling air is provided by a relatively lower temperature by-pass air flow 19 or stages of the low pressure compressor 22. The axial location within the gas turbine engine 10 of the spiral wound cross-flow heat exchanger 40 may also change depending on the fluid location to be cooled of that which is used for cooling.

Further, the hot fluid, for example oil, may be cooled by a liquid, for example fuel, which is often stored in aircraft wings and is exposed to the cold ambient conditions experienced at typical flight altitudes, for example. Therefore, the relatively cooler temperature fuel may be used as the means for absorbing thermal energy from the relatively higher temperature cooling fluid or oil. In such an embodiment, the spiral wound cross-flow heat exchanger 40 may be positioned in a variety of locations, for non-limiting example, as shown radially inward of an engine cowling 32. As with the previous embodiment, the spiral wound cross-flow heat exchanger 40 may also be moved axially depending on the location of the, for example, fluid to be cooled.

In still further embodiments, the spiral wound cross-flow heat exchanger 40 may be gas to gas or air to air heat exchanger and may again be positioned in a variety of locations, for example in the by-pass air flow 19 so that the relatively cooler by-pass air flow 19 cools the relatively higher temperature compressor discharge air. Or according to other embodiments, the higher temperature compressor discharge air may be cooled by lower temperature air from the low pressure compressor 22. In this instance, the spiral wound cross-flow heat exchanger 40 may be located within the engine cowling 32 or within the by-pass air flow 19.

While gas—gas heat exchange is described according to one embodiment, according to embodiments, gas—liquid heat exchange may be within the scope of the instant embodiments wherein the liquid may be sub-cooled, saturated, supercritical or partially vaporized. For example, the compressor discharge flow path may be cooled with water, water-based coolant mixtures, dielectric liquids, liquid fuels or fuel mixtures, refrigerants, cryogens, or cryogenic fuels such as liquefied natural gas (LNG) and liquid hydrogen. However, this list is not exhaustive and therefore should not be considered limiting. Further, the lubricating fluids such as oil may be cooled in similar matters.

Thus, as depicted in FIG. 1, the spiral wound cross-flow heat exchanger 40 may be positioned at a plurality of locations, some of which are shown in a non-limiting exemplary manner. The spiral wound cross-flow heat exchanger 40 may also be used to cool fluids which are in a gaseous state or in a liquid state by other fluids which are in a gaseous state or a fluid state. In any of these embodiments, the spiral wound cross-flow heat exchanger 40 utilizes one of a first fluid or a second fluid to cool the other of the first fluid and the second fluid.

Figure 2:
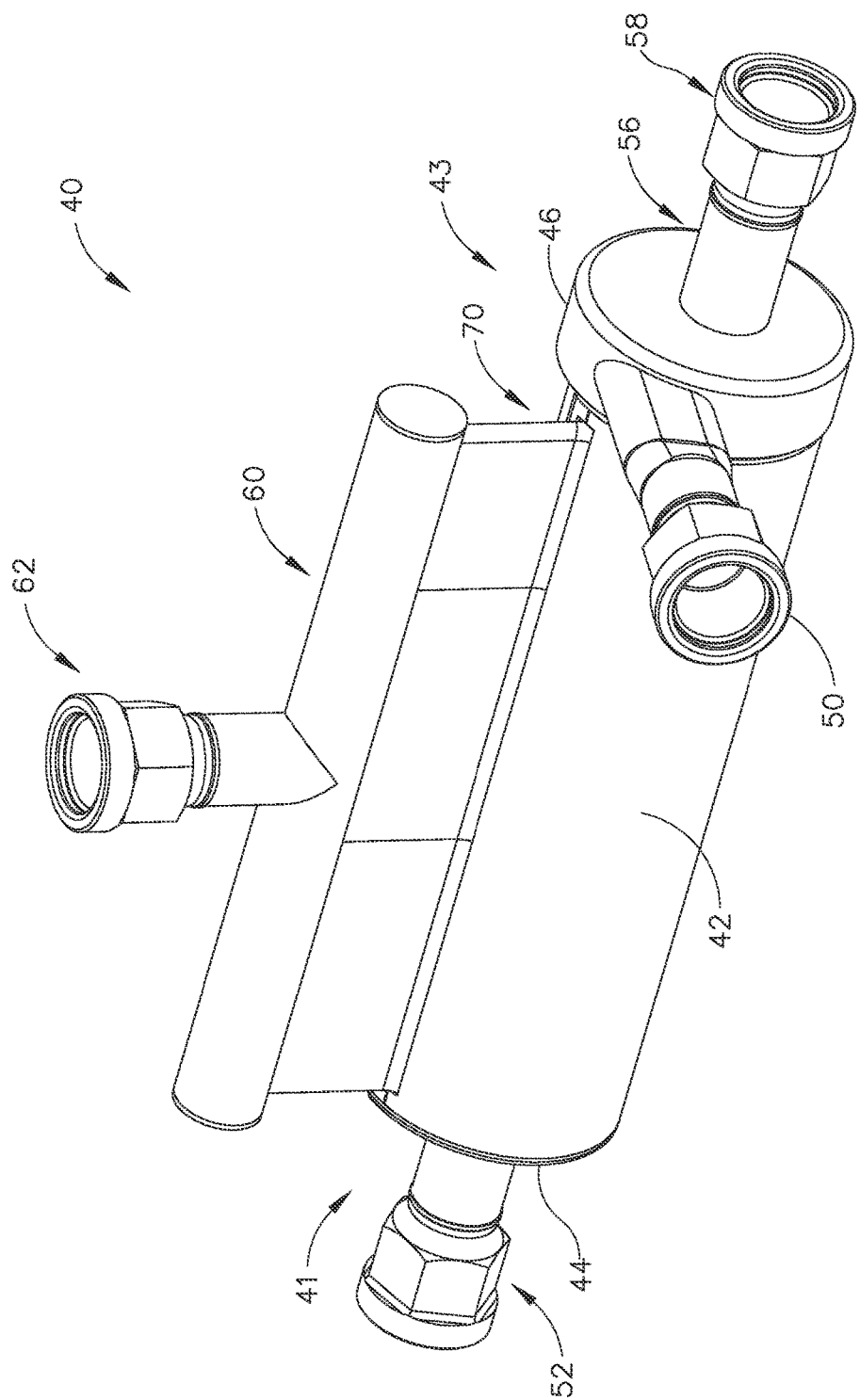
FIG. 2 is an isometric view of an exemplary spiral wound cross-flow heat exchanger.

Referring now to FIG. 2, an isometric view of the spiral wound cross-flow heat exchanger 40 is depicted. The spiral wound cross-flow heat exchanger 40 is generally cylindrical in shape according to one embodiment. The spiral wound cross-flow heat exchanger 40 is cylindrical in shape as defined by a housing 42 which further comprises first and second axial ends 41, 43 at ends of the housing 42. Although the shape of the spiral wound cross-flow heat exchanger 40 is generally cylindrical, other shapes may be utilized where the housing 42 is substantially hollow and wherein the flow body 70 may be positioned within the housing 42. A portion of the flow body 70 is shown extending from the housing 42.

The spiral wound cross-flow heat exchanger 40 further comprises first and second end caps 44, 46 which close axial ends of the housing 42. The spiral wound cross-flow heat exchanger 40 comprises a cross-flow fluid input 50 near an axial end of the housing 42. Specifically, the cross-flow fluid input 50 is located on end cap 46 and allows for flow of the second fluid along the axial dimension of the spiral wound cross-flow heat exchanger 40. At the end cap 46, a manifold 56 is positioned to receive a first fluid which passes into the spiral wound cross-flow heat exchanger 40 and through the flow body 70.

The spiral wound cross-flow heat exchanger 40 may comprise a cross-flow fluid output 52 located at or near end cap 44. Alternatively, the cross-flow fluid output 52 may be located at other locations. One of ordinary skill in the art should also recognize that the cross-flow fluid input 50 and the cross-flow fluid output 52 are termed input and output but these terms are merely exemplary. Further, the cross-flow fluid output 52 may alternatively be an input and the cross-flow fluid input 50 may alternatively be an output depending on the flow direction moving through the spiral wound cross-flow heat exchanger 40. Such descriptors should not be considered limiting.

The manifold 56 may comprise a fitting 58 for service connection to a first fluid supply. Extending from the top of the spiral wound cross-flow heat exchanger 40 is a second manifold 60 which also has a fitting 62 and is depicted in flow communication with a reservoir. Generally, hot fluid returns to the spiral wound cross-flow heat exchanger 40 and is cooled before going to a reservoir for future lubricating or other use, for example. One of the fittings 58, 62 and manifolds 56, 60 serves as an input for a first fluid and the other of the fittings 58, 62 and the manifolds 56, 60 serves as an output for the first fluid. One of the cross-flow fluid input 50 and the cross-flow fluid output 52 serves as the input for a second cross-flow fluid and the other serves as an output. These may be reversed however and the labels are merely descriptive. In the instant embodiment, one of the first and second fluids is of a relatively higher temperature while the other of the first and second fluids is of a relatively lower temperature. When the two fluids pass through the spiral wound cross-flow heat exchanger 40, the higher thermal energy of one fluid is reduced or transferred to the lower thermal energy material. While the hot fluid is described passing through the flow body 70 and the cross-flow fluid is described as the cooler fluid, this may also be reversed, for example, if the hotter fluid is a gas and passes as the cross-flow through the spiral wound cross-flow heat exchanger 40.

Although the manifolds 56, 60 are shown in the depicted positions, it may be that the manifolds 56, 60 may be moved to positions other than an axial end of the spiral wound cross-flow heat exchanger 40 and some position between the axial ends 41, 43. Similarly, the connections for the second, cross-flow fluid input and output 50, 52 may be located at or between the axial ends 41, 43 as depicted or alternatively, may be moved to alternate locations. In other words, the depicted positions of the fittings 58, 62 and manifolds 56, 60 are not limited and the depicted positions of the fittings 58, 62 for the cross-flow at cross-flow fluid input and output connections 50, 52 also not limiting. Similarly, the hot flow may pass within the flow body 70 while the cooler flow may pass within the flow body 70 or about the flow body 70.

It should also be noted that while several of the parts in this embodiment are shown elongated for purpose of clarity of teaching and understanding, the device may take other forms which are more compact for improved flow characteristics. For example, the cross-flow fluid input and output connections 50, 52 may be shortened. Further, while the flow body 70 is shown extending above housing 42, the portion of the flow body 70 extending to the manifold 60 may be shortened and positioned closer to the housing 42. Likewise fittings 58, 62 may be formed of a more compact design, all of which are in an effort to render the heat exchanger, smaller, more lightweight for improved flow and positioning in various architectures including, but not limited to, aircraft engines.

Figure 3:
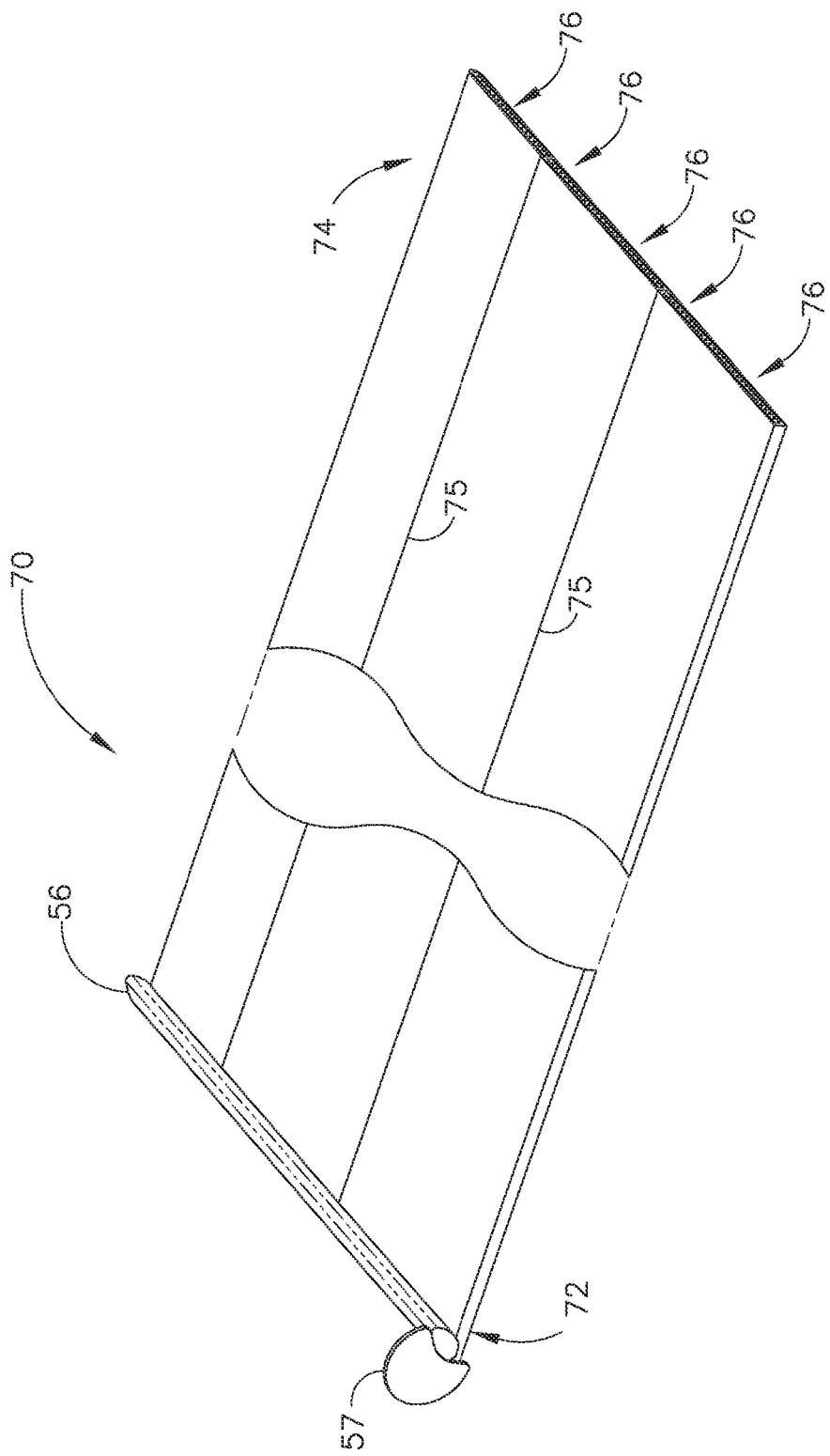
FIG. 3 is an isometric view of a flow body flat pattern including a manifold and support fins.

Referring now to FIG. 3, an isometric view of an exemplary flow body 70 is depicted. The flow body 70 may be an extruded form having a first end 72 and a second end 74 and a plurality of flow passages 76 extending between the first and second ends 72, 74. The first end 72 and the second end 74 define lateral or circumferential ends when oriented in the exemplary spiral wound cross-flow heat exchanger 40. The flow passages 76 are in flow communication with the manifold 56 and the manifold 60 (FIG. 2). In this embodiment, the flow body 70 is shown as a flat structure and is not yet wound in successive layers into a spiral form as will be discussed further herein and as is necessary for the embodiment of FIG. 2.

At the first end 72 of the flow body 70 is the manifold 56. The manifold 56 receives a first fluid which may either be the relatively hot fluid or the relatively cold fluid. The first fluid passes through the manifold 56 and into the flow body 70 through the plurality of flow passages 76 so as to move toward the second end 74 of the flow body 70. At the second end 74 of the flow body 70, is the second manifold 60 (FIG. 2).

The manifold 56 may further comprise a plurality of support fins 57 which aid to support the flow body 70 when the flow body 70 is wound or wrapped about the manifold 56. The support fins 57 may have a constant radius which supports the flow body 70 or may have a varying radius. The support fins 57 provide support for the flow body 70 by preventing the flow body 70 from being crushed during the winding process or alternatively, crushed due to a radius being too small.

Extending between the first end 72 and the second end 74 are turbulence trips 75. These trips 75 may be in the form of ribs or other extensions from the surface or alternatively, may be in the form of depressions. These variations will be described further herein. Also, the trips 75 while shown being circumferential when the flow body 70 is in a spiral form, may alternatively extend in the axial direction or at an angle to the circumferential or axial direction. For example, the trips 75 may form spirals when the flow body 70 is wound.

Figure 4:
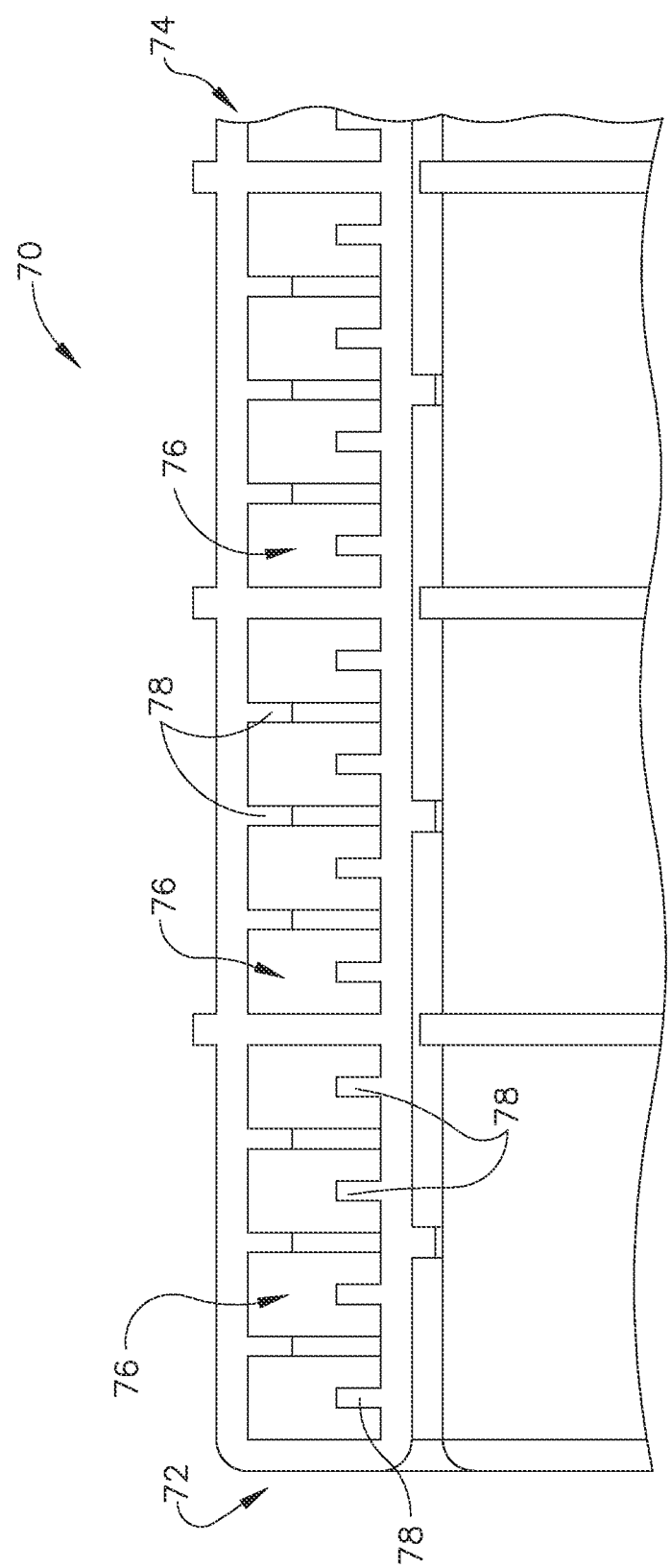
FIG. 4 is a cross-sectional end view of an exemplary heat exchanger flow body illustrating a method for turbulating the cross-flow between turns.

Referring now to FIG. 4, an end section view of the flow body 70 is depicted. The ends of the flow body 70 may be the first end 72 or the second end 74, as depicted. For example, at the flow body second end 74, the plurality of flow passages 76 are shown. In the depicted section, a plurality of flow passages 76 are depicted. However, a smaller or larger number of flow passages 76 may be desirable as an increased number of flow passages generally results in improved heat exchange through the spiral wound cross-flow heat exchanger 40.

In addition, the flow passages 76 may include a plurality of turbulators 78. The turbulators 78 improve turbulent flow within the flow passages 76 in an effort to increase turbulence, reduce thermal boundaries and improve heat transfer within the flow passage 76. The turbulators 78 on opposite surfaces are offset in the axial direction of the spiral wound cross-flow heat exchanger 40 within each flow passage 76. However, the turbulators 78 may have various designs within the flow passages 76. The flow passages 76 are in flow communication with the first manifold 56 and the second manifold 60 and the turbulators 78, and may be continuous through the flow body 70 or alternatively may be discontinuous. According to some embodiments, the flow body 70 may be extruded but may be formed in other ways dictating such continuous or discontinuous form.

Figure 5:
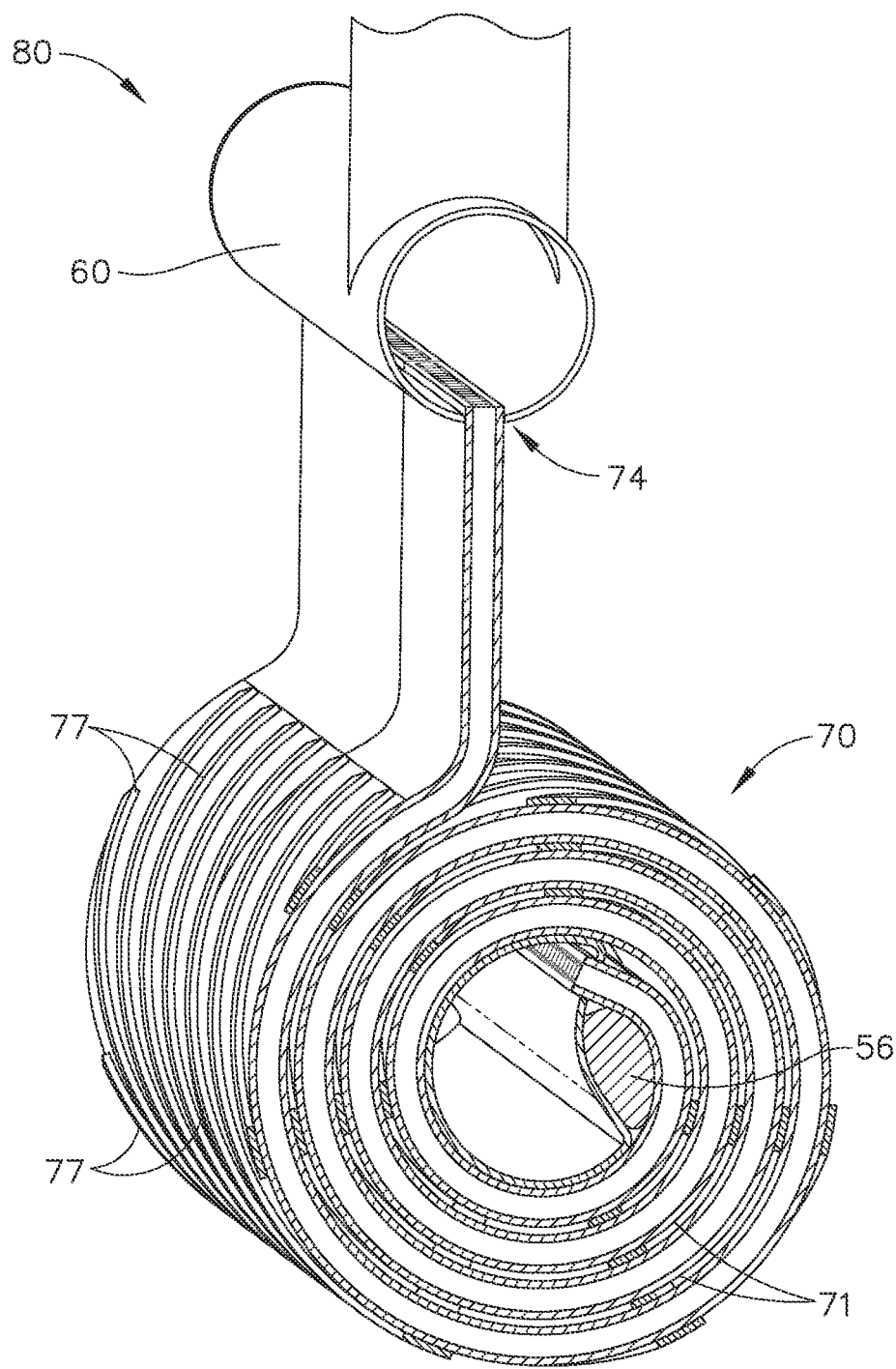
FIG. 5 is an isometric view of a spiral wound flow body including a first manifold and a second manifold.

Referring now to FIG. 5, an isometric view of a heat exchanger core 80 is depicted. The heat exchanger core 80 comprises the flow body 70 which is shown wrapped in successive layers 71 about the first manifold 56. In this view, the flow body 70 is formed into a spiral wound about the first manifold 56. The spiral flow body 70 takes the form of a spiral wherein the successive layers 71 have a substantially constant distance from the center of the spiral. As used herein, the term "spiral" is intended to mean a core which is geometrically described by a radial cross-section having the characteristics of an involute of a circle wherein the successive layers 71 or turnings of the spiral have a generally constant separation distance and further that axial ends of the successive layers 71 are aligned in the radial direction of the spiral wound cross-flow heat exchanger 40. In other words, the lateral ends of the successive layers 71 of the flow body 70 are aligned radially at axial ends within the spiral wound cross-flow heat exchanger 40.

The figure also depicts that the fluid flow from the first manifold 56 is in flow communication with the second manifold 60 through the plurality of flow passages 76 within the flow body 70. The second manifold 60 is sectioned to show the flow passages 76 at the second end 74 of the flow body 70. The flow is collected in the second manifold 60 and extends through the upwardly extending conduit to the fitting 62 (FIG. 2).

Additionally in this embodiment at least one rib 77 is shown on the surface of the successive layers 71 of the flow body 70. The rib 77 is exemplary and may or may not be used. The rib 77 may be a single rib or may be a plurality of ribs 77. The ribs 77 are shown disposed at an angle to the purely axial direction and may be arranged purely circumferentially (normal to the axial direction of the heat exchanger) or may be angled, for example, in the form of a spiral as shown. The at least one rib 77 may trip the fluid flow between successive layers 71 which further improves heat transfer by creating turbulence between the layers 71 and along the exterior surface of the flow body 70.

Figure 6:
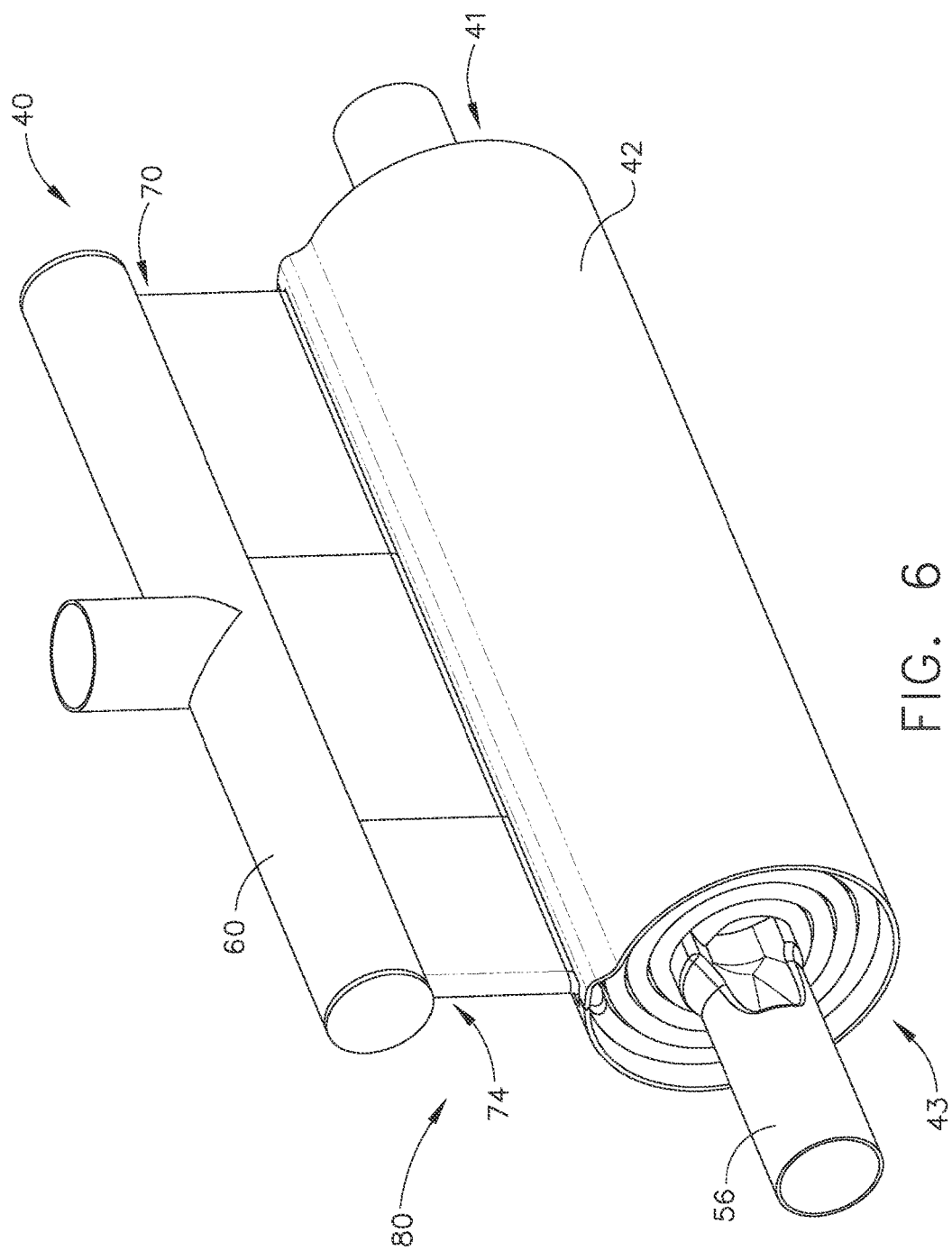
FIG. 6 is an isometric view of a housing or shell disposed over a flow body with attached manifolds.

Referring now to FIG. 6, the spiral wound cross-flow heat exchanger 40 is depicted with the heat exchanger core 80 positioned within the housing 42. The second manifold 60 is shown above the housing 42 and the extrusion second end 74 is extending through the housing 42. This allows for connection of the second manifold 60 on the exterior of the housing 42. The first manifold 56 is also shown extending from within the heat exchanger core 80 and in an axial direction outwardly from an axial end 43 of the housing 42. This allows for positioning of the end cap 46 (FIG. 2) and the fitting 58 (FIG. 2).

The housing 42 is depicted as being substantially circular in cross-sectional shape. However, alternate shapes may be utilized depending upon the flow characteristics needed through the housing 42 and the exterior shape wherein the spiral wound cross-flow heat exchanger 40 will be located.

Also shown within the figure, the plurality of successive layers 71 (FIG. 5) depict locations through which the second cross-flow fluid may move in the axial direction from the second axial end 43 toward the first axial end 41, or vice versa.

Figure 7:
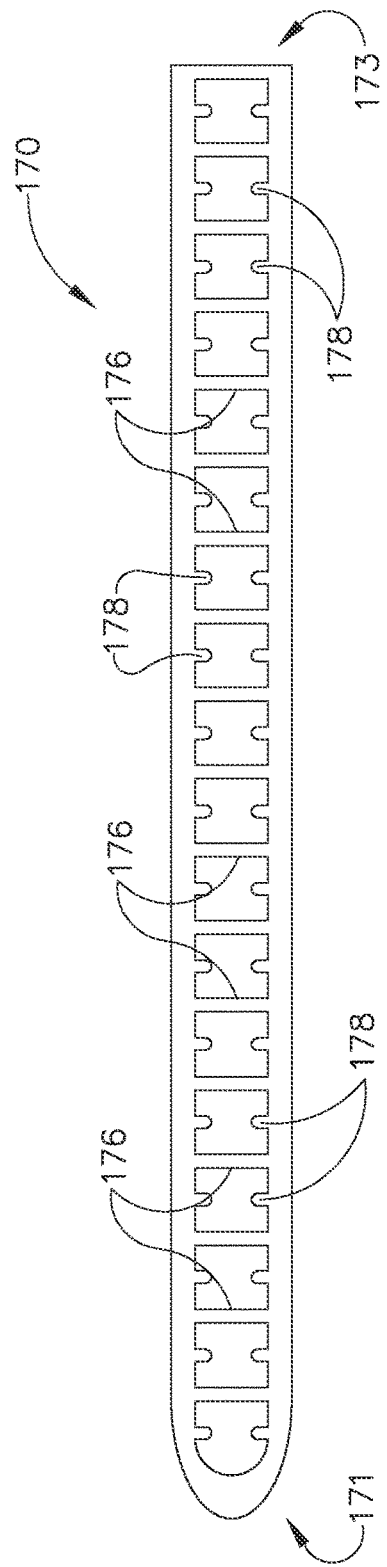
FIG. 7 is an end section view of an exemplary flow body.

Referring now to FIG. 7, a cross-sectional view of an exemplary flow body 170 is depicted. The flow body 170 has a first lateral end 171 and a second lateral end 173. The first lateral end 171 is rounded to improve fluid dynamics at the entrance to the successive layers of the flow body 170. Although this embodiment depicts a rounded lateral end 171, such embodiment is merely exemplary and is not necessary. Other shapes including flat surfaces may be utilized.

Further, in the exemplary embodiment, a plurality of flow passages 176 are depicted. These flow passages 176 are of a differing cross-sectional shape than the previous embodiment of flow body 70. For example, in the previous embodiment, the flow passages 76 were generally rectangular in shape. In the instant embodiment, however, the flow passages 176 are square in shape. One skilled in the art will recognize that these embodiments or not limiting and other cross-sectional shapes may be utilized. For example, it may be desirable to provide radiused corners within the flow passages to improve flow characteristics therethrough. Additionally, the flow passages 176 may have a consistent cross-sectional shape or alternatively, may differ within the flow body 170. In the depicted embodiment, the end passages are rounded in part to aid in flow characteristics therethrough.

Within the flow passages 176 are a plurality of turbulators 178. Different from the previous embodiment, the turbulators 178 are aligned in the vertical direction rather than offset from one another in the heat exchanger axial direction. The turbulators 178 may vary in shape and position depending on the size of the cross-sectional flow passages. Also, the turbulators 178 may be at an angle to circumferential or purely circumferential as shown. Alternatively, these may be formed solid to preclude leakage from impact at the leading edge, for example.

Figure 8:
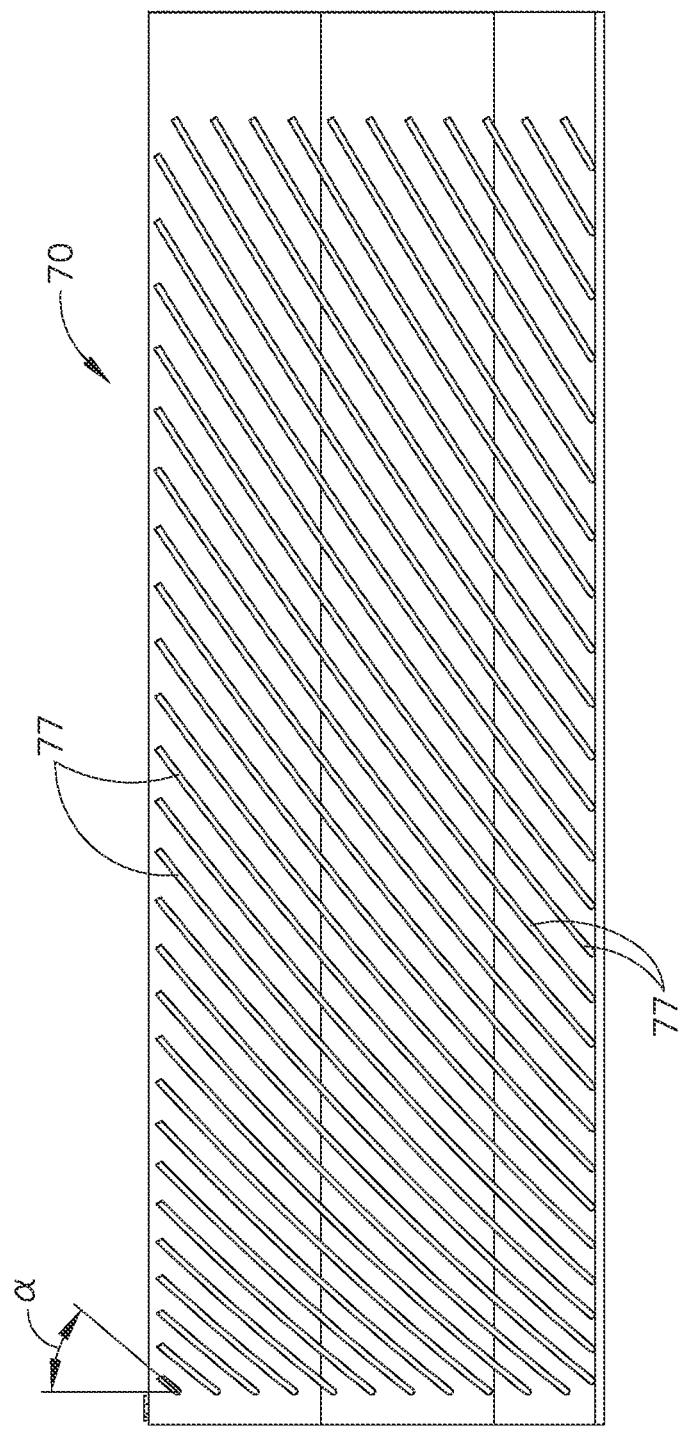
FIG. 8 is a top view of an alternate flow body flat pattern having angled ribs.

Referring now to FIG. 8, a top view of the flow body 70 is shown extended from the wound position. In this view, the plurality of ribs 77 is shown. The ribs 77 are arranged at an angle to the axial direction of the flow body 70. The angle is depicted by the symbol alpha α. The angle may be 0° or the angle might be up to about 90°. Additionally, the ribs 77 may be formed to provide a spiral when the flow body 70 is wound into the successive layers 71 (FIG. 5). As described further, the ribs 77 may alternatively define depressions forming grooves in the flow body 70 to also interrupt or trip fluid passing over the surface of the flow body 70.

The flow bodies 70, 170 may be formed of a high thermally conductive material. For example, an aluminum or aluminum alloy may be utilized or alternatively a casting alloy, copper casting alloy (C81500) or cast aluminum bronze (C95400) may be utilized. Still further, the flow bodies 70, 170 may be formed of, but are not limited to, incoloy alloy, Inconel alloy, titanium-aluminide alloy stainless steel alloy or refractory metals. It may be desirable to as closely match coefficient of thermal expansion (CTE) in order to reduce stress build up during production and operation of the different fluid flow materials utilized within the spiral wound cross-flow heat exchanger 40. Desirable features for the materials utilized include outstanding resistance to fatigue and oxidation resistance or corrosion resistance. Additionally, pressure tight castings, incorporation into welded assemblies of cast or wrought parts, highly effective vibration damping and machinability and weldability are all desirable characteristics. While the above list of characteristics is provided, such is not limiting as various materials may be utilized for the matching of flow passage and body components.

Figure 9:
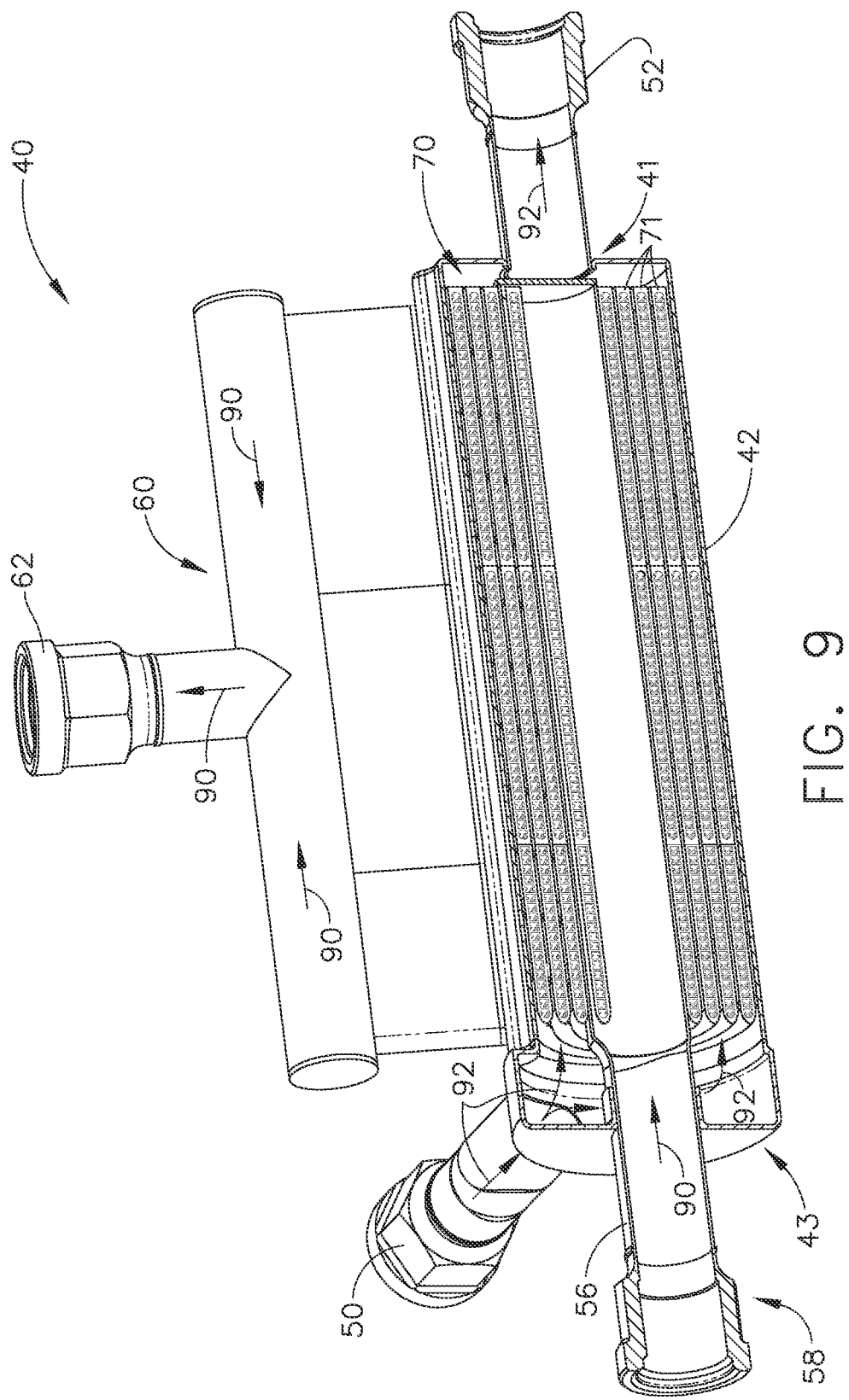
FIG. 9 is a side section view of an exemplary spiral wound, cross-flow heat exchanger.

Referring now to FIG. 9, an isometric cross-section view of the spiral wound cross-flow heat exchanger 40. In this view, the interior of the housing 42 is shown including the flow body 70. At one axial end of the spiral wound cross-flow heat exchanger 40 is the manifold 56 extending from the flow body 70.

The flow body 70 includes a first fluid flow 90 which moves through the manifold 56. Specifically, the first fluid flow 90 passes through the manifold 56 between the first fitting 58, the second manifold 60 and the second fitting 62. The first fluid flow 90 may pass in either direction between these two manifolds 56, 60 and through the flow body 70. As the first fluid flow 90 passes through the spiral wound cross-flow heat exchanger 40, the first fluid flow 90 flows the spiral pattern of the flow body 70 within the spiral wound cross-flow heat exchanger 40 during movement between the fitting 58 and the fitting 62.

Further, the spiral wound cross-flow heat exchanger 40 utilizes a second cross-flow 92 which enters the spiral wound cross-flow heat exchanger 40 through the cross-flow fluid input 50 and passes across the successive layers 71 of the wound flow body 70. The second cross-flow 92 enters at one axial end of the housing 42 and passes to the other axial end. In doing so, the second cross-flow 92 passes along the surfaces of the flow body 70 to exchange thermal energy with the first fluid flow 90 passing within the flow body 70. The second cross-flow 92 moves substantially axially through the spiral wound cross-flow heat exchanger 40 while the first fluid flow 90 follows the spiral path of the flow body 70.

One end of the flow body 70 may be curved or tapered for improved aero/fluid dynamic performance of the second cross-flow 92.

As the second cross-flow 92 passes through the housing 42 and the layers 71 of the flow body 70, the second cross-flow 92 may pass change directions either radially inwardly or radially outwardly. Further, the ribs 77 (FIG. 8) cause the second cross-flow 92 to move radially or at an angle to the axial direction.

Figure 10:
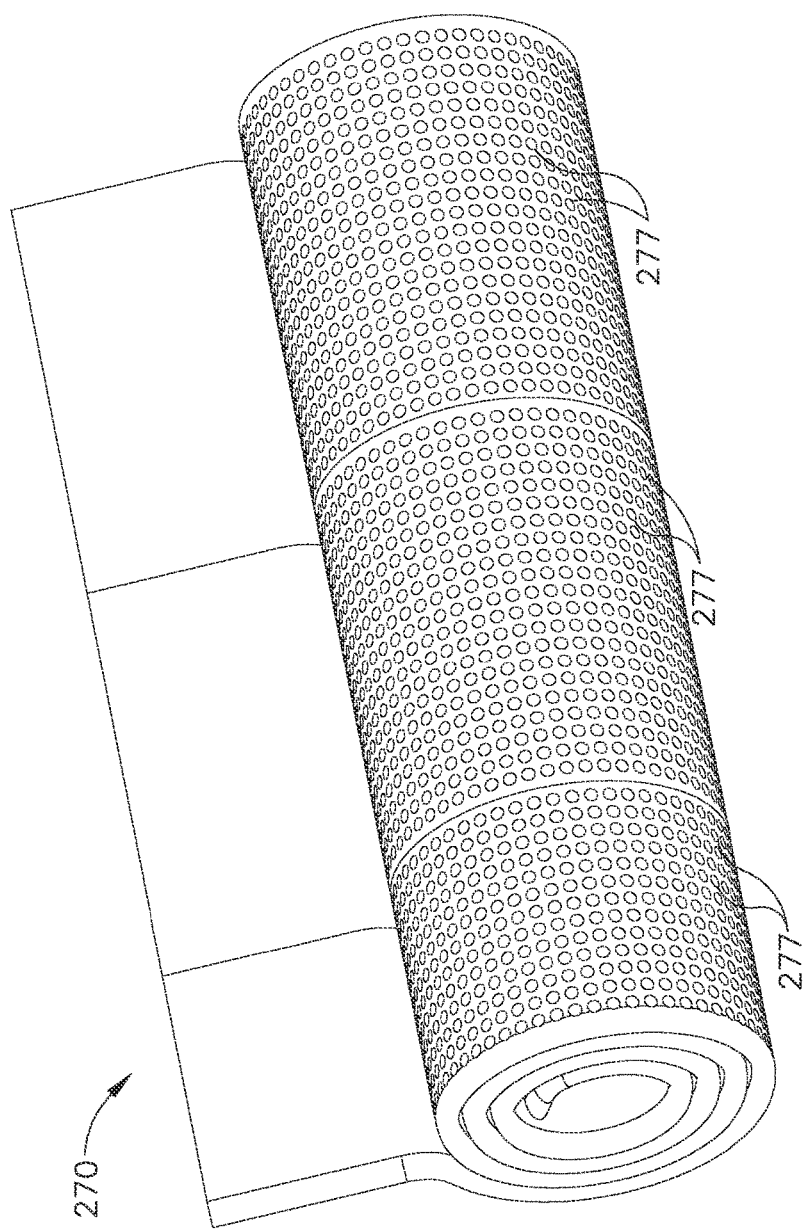
FIG. 10 is an isometric view of a flow body with a dimpled texture for flow turbulation; and, FIG. 11 is an isometric view of a spiral wound flow body with multiple flow passes between the first fluid and cross-flow of the second fluid.

With reference now to FIG. 10, a further embodiment of the flow body 270 is shown. In this embodiment, the outer surface of the flow body 270 comprises a plurality of dimples 277 which are shown as circular in shape. However, the dimples 277 may be formed of various shapes other than round. The dimples 277 create trips or flow disturbances causing turbulence in the second cross-flow 92 (FIG. 9) passing across the flow body 270. The turbulence also provides for improved heat transfer by reducing thermal boundaries along the exterior surface and reducing thermal resistance between the cross-flow 92 and the flow body 270. Further, the dimples 277 may be recessed, into the flow body 270 surface or the dimples 277 may be raised from the surface of the flow body 270. The dimples 277 are shown arranged in a pattern of circumferential and axial rows. However, one of the axial or circumferential rows may be slightly offset from an adjacent axial or circumferential row. In still a further embodiment, the dimples 277 may be formed randomly, although this may be less desirable since increased numbers of dimples 277 may provide increased turbulence of the second cross-flow 92 (FIG. 9) across the flow body 270.

Still further, the dimples 277 may also take other forms such as linear grooves which extend circumferentially or at an angle between circumferentially or axially. Thus, rather than ribs 77 (FIG. 8) extending from the surface of the flow body 70, 170, 270, the flow body may have linear grooves which look like the ribs 77 of FIG. 8 but instead are recessed in the flow body.

Figure 11:
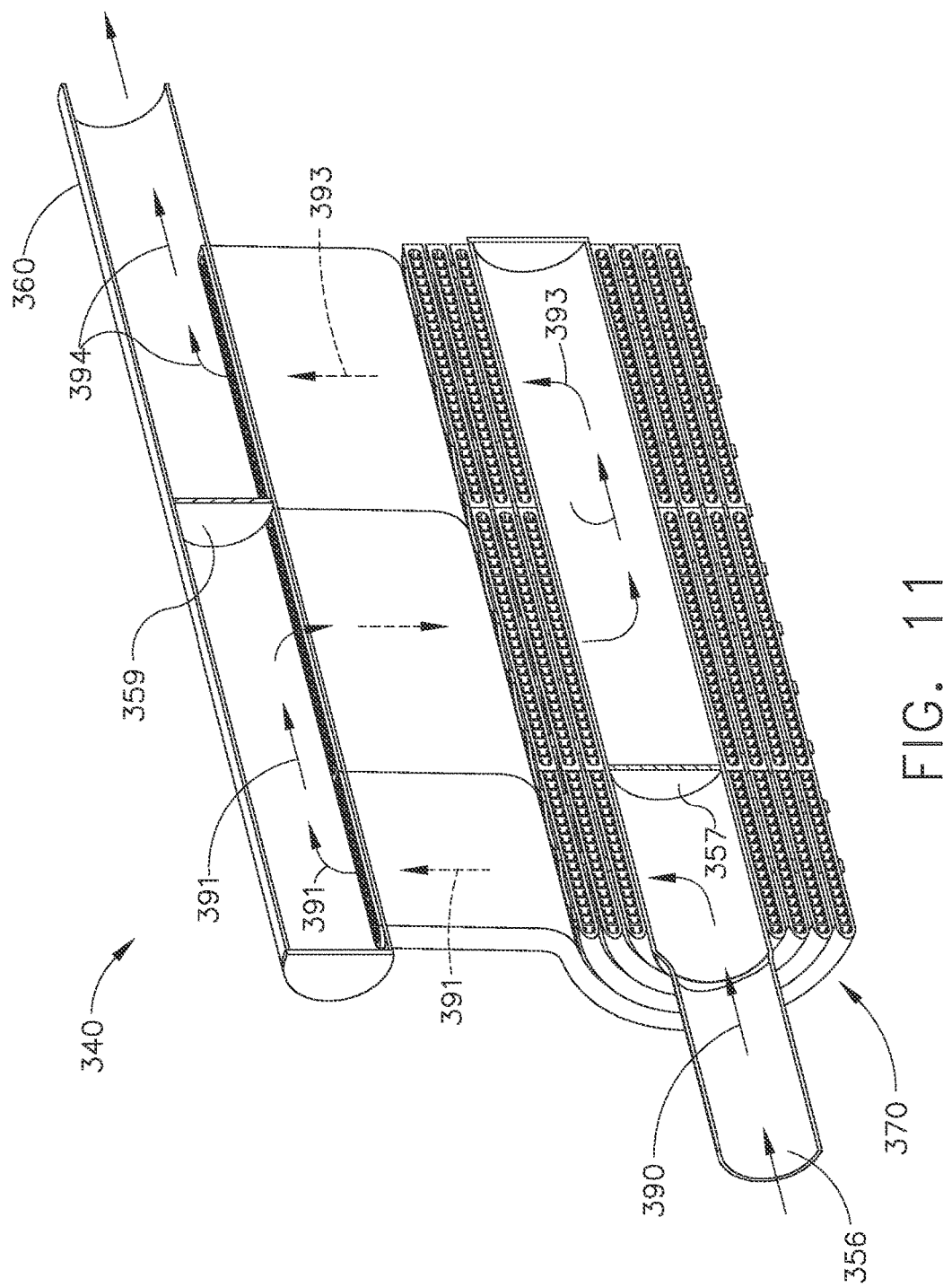

Referring now to FIG. 11, a further alternative embodiment is depicted of a spiral wound cross-flow heat exchanger 340. This embodiment provides for multiple passes of a first fluid flow 390 through a flow body 370. The figure depicts that the spiral wound cross-flow heat exchanger 340 has a first manifold 356 and a second manifold 360 as with previous embodiments. The first fluid flow 390 passes between the first manifold 356 and the second manifold 360 and through the flow body 370 between layers. However, the first fluid flow 390 passes from the flow body 370 to the second manifold 360, back into the flow body 370 and back to the second manifold 360 before exiting the spiral wound cross-flow heat exchanger 340.

In this embodiment, the first fluid flow 390 is shown at the left side of the figure near an axial end of the manifold 356. This is illustrative of an entrance but is not limiting as other entrance locations may be utilized. The first fluid flow 390 moves through the manifold 356 and engages a partition 357 causing the first fluid flow 390 to move into the flow body 370. The first flow spirals about the flow body 370 in the axial region corresponding to the partition 357. The first fluid flow 390 then moves into the manifold 360 and is represented by arrow 391 although the flow is the same as first fluid flow 390. The number change is to merely ease description. The first fluid flow 390, represented by arrow 391, moves axially and engages the second partition 359 and causing the flow to enter the flow body 370. Upon spiraling again, the first fluid flow 390 moves into the first manifold 356 and is represented by arrow 393. The first fluid flow 390, represented by arrow 393, then reaches an end (at right hand end depicted) of the manifold 356 and is forced to again enter the flow body 370 spiraling to the manifold 356. In this location, the first fluid flow 390 is depicted as flow 394.

This first fluid flow 390 therefore has multiple passes through the flow body 370 and while the first fluid flow 390 is shown entering the second manifold 360 twice, the process may be repeated more times depending on the pressure drop of the fluid, desired cooling or other parameters which may be considered.

Although a number of examples are provided for material usage, one skilled in the art will recognize that this description is not limiting and other materials and combinations may be utilized as required by the application. Some parameters include but are not limited to, temperature, pressure, chemical compatibility with the fluid, and coefficient of thermal expansion. This list is non-exhaustive and other materials and compatibility features may be considered. For example, other plastics, polymers and ceramics may be desirable for some aspects of the heat exchanger.

The foregoing description of apparatus, systems and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

What is claimed is:

1. A spiral wound heat exchanger, comprising:
    a first manifold;
    a flow body in flow communication with the first manifold, wherein the flow body extends about the first manifold and defines a spiral of successive layers formed by an involute of a circle;
    a plurality of flow passages, included in the flow body, extending between a first end and a second end of the flow body for a first fluid; and
    a second manifold in flow communication with the flow body, wherein the flow body is disposed within a housing that defines a cross-flow path for a second fluid that extends across the successive layers of said flow body.

2. The spiral wound heat exchanger of claim 1, further comprising at least one flow trip.

3. The spiral wound heat exchanger of claim 2, wherein the at least one flow trip includes at least one of: a rib on outer surfaces of the flow body, a groove, or a dimple.

4. The spiral wound heat exchanger of claim 2, wherein the at least one flow trip includes a plurality of dimples arranged at least one of: randomly or in a predetermined pattern.

5. The spiral wound heat exchanger of claim 3, wherein the at least one flow trip includes a rib which at least one of: extends circumferentially about the flow body, extends helically, or includes a set of ribs arranged at an angle, a, in the axial direction.

6. The spiral wound heat exchanger of claim 1, wherein the plurality of flow passages include a plurality of turbulators.

7. The spiral wound heat exchanger of claim 6, wherein the plurality of turbulators are disposed on opposite surfaces.

8. The spiral wound heat exchanger of claim 7, wherein the plurality of turbulators on the opposite surfaces are offset from one another in an axial direction.

9. The spiral wound heat exchanger of claim 6, wherein the plurality of turbulators are opposite one another.

10. The spiral wound heat exchanger of claim 1, wherein the housing is cylindrical.

11. The spiral wound heat exchanger of claim 1, further comprising at least one of an inlet or an outlet positioned between axial ends of the housing for the second fluid.

12. The spiral wound heat exchanger of claim 1, further comprising at least one of a second inlet or an outlet at axial ends of the housing for the first fluid.

13. The spiral wound heat exchanger of claim 1, further comprising at least one support fin connected to at least one of the first or second manifold.

14. The spiral wound heat exchanger of claim 13, wherein the at least one support fin supports the flow body when wound about the manifold.

15. The spiral wound heat exchanger of claim 1, wherein the flow body has a curved leading edge relative to the cross-flow path.

16. The spiral wound heat exchanger of claim 1, wherein the flow body is positioned such that the fluid contained within the plurality of flow passages flows both radially inward and radially outward for some portion of the flow path as it traverses through said flow body.

17. The spiral wound heat exchanger of claim 16, further comprising a set of partitions that direct flows both radially inward and radially outward.

* * * * *